United States Patent [19]

Hanisko et al.

[11] Patent Number: 4,804,856
[45] Date of Patent: Feb. 14, 1989

[54] AUTOMOTIVE ANTI-THEFT DEVICE

[75] Inventors: John-Cyril P. Hanisko, Southfield; Victor J. Borowski, Dearborn, both of Mich.

[73] Assignee: Cy Vi Co, Livonia, Mich.

[21] Appl. No.: 59,300

[22] Filed: Jun. 8, 1987

Related U.S. Application Data

[63] Continuation-in-part of Ser. No. 817,467, Jan. 9, 1986, Pat. No. 4,672,225.

[51] Int. Cl.$^4$ .................. H02J 13/00; B60R 25/04
[52] U.S. Cl. .................. 307/10 AT; 361/172; 200/43.05; 180/287
[58] Field of Search ........ 307/10 AT; 340/64, 825.31; 123/179 BG; 317/134; 70/255; 180/287; 361/172; 200/42.02, 43.04, 43.05

[56]  References Cited

U.S. PATENT DOCUMENTS 4,157,479 6/1979 Chan ........................... 307/10 AT
4,672,225 6/1987 Hanisko et al. ............... 307/10 AT Primary Examiner—William M. Shoop, Jr.
Assistant Examiner—Sharon D. Logan
Attorney, Agent, or Firm—Cullen, Sloman, Cantor, Grauer, Scott & Rutherford

[57]   ABSTRACT

An anti-theft device for automobile vehicles disables the vehicle's starter ignition system unless a coded resistive element is inserted into the device by the vehicle's operator. A control system senses the value of the coded resistive element and enables the starter system if the sensed value is correct. A latching circuit latches-in enablement of the starter system after an arming switch is activated and the resistive element has been removed, serving to provide a valet function. A lock-out circuit prevents enablement of the starter system for a prescribed time period following an unauthorized attempt at enabling the system, as when an incorrect resistive element is inserted into the device. The device employs a normally closed relay to enable the starter system so that failure of those portions of the device which are most likely to fail does not affect normal operation of the starter system.

14 Claims, 2 Drawing Sheets

AUTOMOTIVE ANTI-THEFT DEVICE

RELATED APPLICATIONS

This application is a continuation-in-part application of U.S. Pat. No. 817,467, now U.S. Pat. No. 4,672,225 filed Jan. 9, 1986.

TECHNICAL FIELD

The present invention broadly relates to anti-theft systems for automobile vehicles, and deals more particularly with a security device for selectively disabling a vehicle's starter ignition system.

BACKGROUND ART

The art is replete with various types of anti-theft devices for preventing unauthorized use or theft of vehicles. Some of these devices are relatively simple and are calculated to stop or discourage the unskilled thief but are relatively ineffective in deterring the professional thief. More sophisticated anti-theft devices have been proposed which are relatively complex and may employ complex electronic circuits, typically employing a microcomputer. These latter-mentioned devices, however are relatively expensive in terms of their components and the labor required to assemble them and are subject to reliability problems. Some of these devices impose relatively large idle-current demands on the automotive electrical system and others, in spite of their relative complexity, are not completely effective in deterring the professional thief.

It is generally thought that an anti-theft device which deters the thief for at least five minutes provides an effective anti-theft system. In order to accomplish this objective, the system must be: (1) relatively inaccessible, (2) not readily bypassed or deactivated, and (3) if employing a code, the code must not be readily decipherable either by multiple trial-and-error attempts or by electrical measurements. Moreover, such a device should not interfere with the normal operation of the vehicle.

SUMMARY OF THE INVENTION

According to the present invention, an anti-theft device is provided which is adapted to be connected with a vehicle's starter (ignition) system and employs a coded resistive element having a resistive value unique to the particular device, which functions as a "key" to enable the vehicle's starter system. The resistive element is removably mounted on the vehicle such that the vehicle's operator may remove it from the vehicle and thereby effectively "lock" the vehicle's starter system while unattended. The device includes an arming switch for activating and deactivating the security system. A latching circuit is provided for enabling the starter system after the arming switch is activated and the resistive element is later removed by the operator; in this manner, the vehicle can be started, as by a valet, after the coded resistive element has been removed. A lock-out circuit prevents enablement of the starter system for a preselected time period following an unauthorized attempt at enabling the system, such as when a thief installs a resistive element having an improper resistive value. The proper resistive value is sensed by a window comparator which determines whether the voltage across the resistive element is within a preselected range. The device employs a normally closed relay for closing a set of switch contacts that enable the starter system, which effectively provides a failsafe feature preventing disablement of the starter system in the event of a failure of those components of the device which are most likely to fail.

In an alternate embodiment of the invention, especially simple circuitry is provided to achieve the functions discussed above and to adapt the device for high volume production.

It is a primary object of the present invention to provide an anti-theft device for an automobile vehicle which is relatively simple in design but yet which is highly effective in deterring unauthorized use of the vehicle.

Another object of the invention is to provide a device as described above which employs a resistive element having a resistive value unique to the device, as a coded key, for enabling the vehicle's starter system and which may be removed from the vehicle by its operator to prevent unauthorized use of the vehicle.

A still further object of the invention is to provide a device as described above which allows use of the vehicle and unlimited restarting of the vehicle, as by a valet, after the vehicle's owner has removed the coded resistive element.

Another object of the invention is to provide a device as described above which is effective in locking out enablement of the starter system when an unauthorized attempt is made to enable the device, as by using an improperly coded resistive element.

A still further object of the invention is to provide a device as described above which does not interfere with normal operation of the vehicle's starter system in the event of a failure of one or more of those components or circuits of the device which are most likely to fail.

Another object of the invention is to provide a device as described above which is especially simple in terms of electronic circuit design, and necessitates a minimum number of electrical components, as well as minimizing the number of different components which must be used in connection with each uniquely valued coded resistor.

These and further features and objects of the invention will be made clear or will become apparent during the course of the following description of a preferred embodiment of the present invention.

BRIEF DESCRIPTION OF THE DRAWINGS

In the drawings, which form an integral part of the specification and are to be read in conjunction therewith.

DESCRIPTION OF THE PREFERRED EMBODIMENTS

Figure 1:
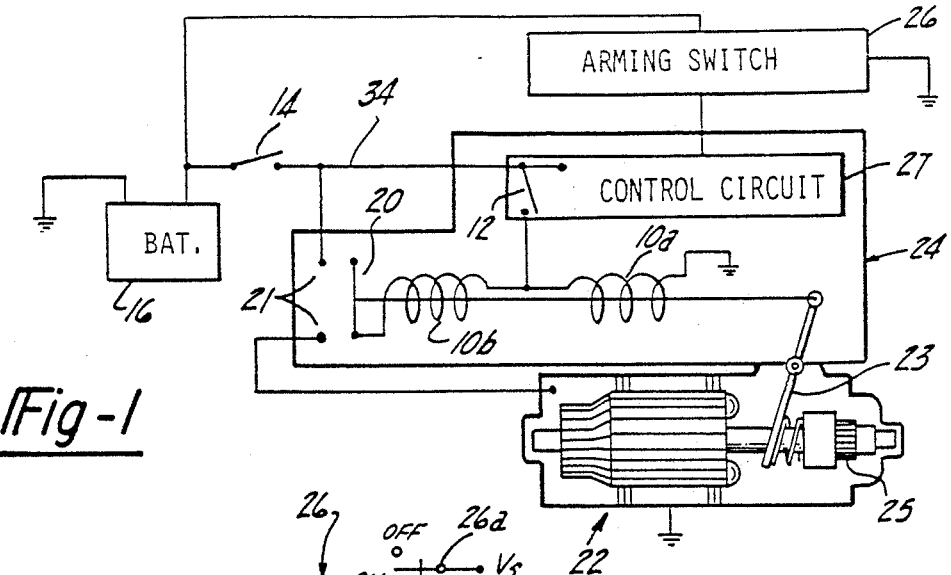
FIG. 1 is a combined broad block and schematic diagram of the automotive anti-theft device which forms one embodiment of the present invention.

Referring first to FIG. 1, the present invention is broadly concerned with an anti-theft device for preventing unauthorized use of an electrically controlled device. In the illustrated embodiment, the protected, electrically controlled device is the starter system of a vehicle. However, it is to be understood that the present invention has application to virtually any type of device which relies on an electrical circuit for its operation or use.

The basic components of a vehicle's starter system are depicted in FIG. 1, having the anti-theft device installed therein. A conventional source of direct current power, such as the battery 16, is connected in a series circuit which includes a conventional starter control (ignition) switch 14, a security switch 12, a pull-in winding 10a and a hold-in winding 10b of a solenoid, and the starter motor 22. With the switches 12 and 14 closed, the battery 16 energizes the coil 10a which operates a plunger 20 which engages (via shift lever 23) the starter drive pinion gear 25 with the engine fly wheel ring gear and simultaneously closes a pair of contacts 21, thereby completing a circuit between the battery 16 and starter motor 22. If an attempt is made to bypass the anti-theft device by jumping the switch terminal 21, the starter motor will be activated, but the starter pinion gear 25 will not be engaged with the engine fly wheel ring gear and the engine will not "start".

The security switch 12, as will be discussed later in more detail, is normally closed, and is controlled by a control circuit 27 and an arming switch 26. The arming switch 26 and starter switch 14 are preferably located inside the vehicle so as to be readily accessible to the vehicle's operator, while the control circuit 27 and security switch 12 may be enclosed within the solenoid housing 24 in the vehicle's engine compartment so as to be relatively inaccessible to a would-be thief.

Figure 2:
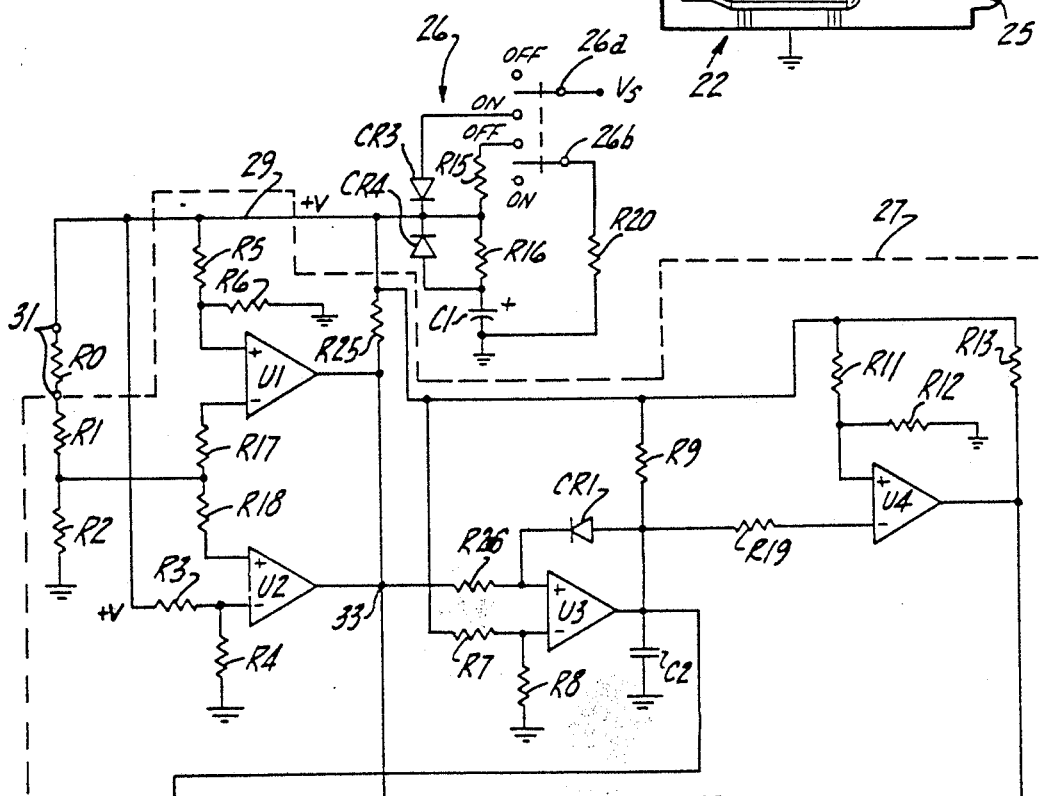
FIG. 2 is a detailed schematic diagram of the arming switch and control circuit shown in FIG. 1; and, FIG. 3 is a detailed schematic diagram of an alternate embodiment of the present invention.
Figure 2:
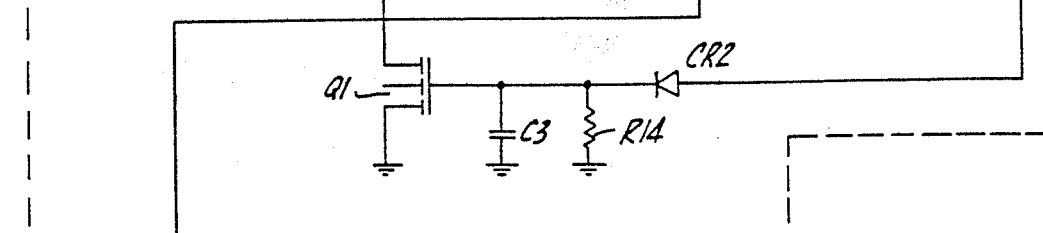
Figure 2:
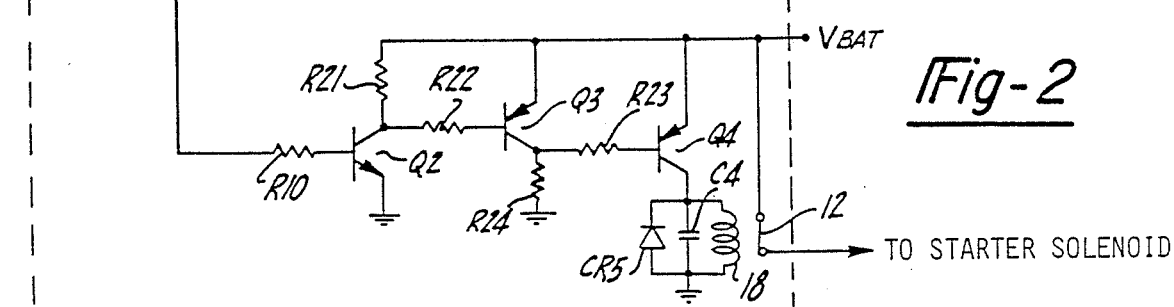

Reference is now made to FIG. 2 wherein the details of the arming switch 26 and control circuit 27 are depicted. The arming switch 26 is a double pole, double throw variety in which one pole 26a is connected with a positive voltage source, $V_s$. The switch 26 may be actuated between a deactivated or off position to an on position. With the switch 26 in the off position, the positive voltage source $V_s$ is disconnected from the control circuit 27 and the switch connected to pole 26b completes a series circuit consisting of resistors R15, R16, R20 and capacitor C1; completion of this latter circuit effectively discharges capacitor C1 to ground. With the switch 26 in the on position, the $V_s$ voltage is applied to the capacitor C1 through diode CR3 and resistor R16, thereby charging capacitor C1. Capacitor C1 functions to maintain the positive supply of voltage, V+, on the control circuit 27 while the vehicle's engine is being cranked and the battery voltage may be pulled below its normal value. With the switch 26 closed, current flows through pole 26a and supply 29 to various portions of the control circuit including a coded resistive element, resistor R0, and a voltage divider formed by resistors R1 and R2. R17 and R18 function as isolating resistors.

Diode CR3 acts as a blocking diode for the time period when the supply (battery) voltage is low, so that capacitor C1 does not quickly discharge through the battery. Diode CR4 provides a shorting path around the resistor R16 during the engine cranking period when the capacitor C1 supplements the supply voltage.

Resistive element R0 is removably installed at terminals 31 in the circuit and may be incorporated, for example, in the standard ignition key such that when the key is inserted into the ignition, the resistive element R0 is inserted into the circuit at terminals 31. Assuming for the moment that resistive element R0 has been inserted and that the switch 26 is toggled to its on position, a voltage is present at the junction of resistors R17 and R18 which is in turn determined by the value of resistors R0, R1 and R2. The voltage at the junction of resistors R17 and R18 is applied to the inverting and non-inverting inputs of operational amplifiers U1 and U2. The op-amps U1 and U2 are configured as a window comparator so that the voltage on the non-inverting and inverting inputs of opamps U1 and U2 are compared to the voltages on the other inputs thereof. The values of resistors R3, R4, R5 and R6 are chosen such that they form a preselected voltage "window". If the voltage on the inverting and non-inverting inputs respectively of op-amps U1 and U2 is within the window, the outputs of these latter-mentioned op-amps go high. Thus, in effect, the window comparator formed by op-amps U1 and U2 senses the voltage and thus the unique resistance of resistive element R0. If the sensed voltage is not within the window, the outputs of op-amps U1 and U2 at terminal 33 are low.

The outputs of the comparators U1 and U2 are each delivered through a resistor R26 to the non-inverting input of an op-amp U3, the inverting input thereof being respectively connected to $V_s$ and ground through resistors R7 and R8. Op-amp U3 is configured as a comparator to compare the voltage on its positive input with a reference value. If the voltage on the positive input of opamp U3 is greater than that on its negative input, the normally low output of opamp U3 goes high. The high output of op-amp U3 is fed back to its positive input through diode CR1, thereby latching-in such high output. In other words, by virtue of the feedback of the high signal, the positive input of op-amp U3 will remain higher than the voltage on its negative input. The high output signal of op-amp U3 is delivered through resistor R19 to the inverting input of an op-amp U4 which is configured as an inverter. The high output of op-amp U3 results in a voltage on the negative input of op-amp U4 which is higher than the positive input thereof. Consequently, the normally high output of op-amp U4 goes low. The output of the inverter U4 is connected through a diode CR2 to the gate of field effect transistor Q1, and is also connected to ground through capacitor C3 and resistor R14. A low output from inverter U4 results in a low signal applied to the gate of transistor Q1. Consequently, transistor Q1 is biased off.

The outputs of comparators U1 and U2 (at terminal 33) are connected to the drain-to-source path of transistor Q1. Thus, it may be appreciated that when transistor Q1 is on, the high signal present at terminal 33 flows to ground. The output of comparator U3 is connected to ground through capacitor C2 and also to the base of a transistor Q2 through resistor R10. Transistor Q1 remains off and the signal present at terminal 33 remains high as long as the output of inverter U4 is low. The high output of comparator U3 turns transistor Q2 on. The collector-to-emitter path of transistor Q2 is connected through a resistor R21 to a line connected to line 34 shown in FIG. 1, wherein voltage is derived from the battery 16 ($V_{BAT}$). Initially, when transistor Q2 is on, there is no flow of current from the collector-to-emitter path thereof until the starter switch 14 is closed to supply the $V_{BAT}$ voltage. With such voltage applied, current flows from the collector-to-emitter path of transistor Q2 and through resistor R21 and through R22 to the base of transistor Q3. Current also flows through the collector-to-emitter path of transistor Q3, thereby turning off transistor Q4. A relay coil 18 for controlling relay switch 12 is connected in parallel relationship with a capacitor C4 and diode CR5, between ground and the collector of transistor Q4. With transistor Q4 off, there is no current flow between the collector-to-emitter path thereof and relay coil 18 is disabled. Disablement of relay coil 18 allows the normally closed relay switch 12 to remain closed, thus completing the series circuit between the starter solenoid 10, battery 16 and starter switch 14, thereby allowing the operator to start the engine.

It should be noted at this point that because the relay switch 12 is normally closed and the transistor Q4 is normally off, the failure of any of the components in the control system described above which are most likely to fail, will not prohibit normal operation of the vehicle's starter system. In the worst case, failure of one of such control system components will disable the control circuit and preclude the device's anti-theft mode but as mentioned previously, such an occurrence has no adverse effect on the starter system itself. Under normal use, as previously mentioned, it is first necessary to toggle the arming switch 26 to the on position. However, it is necessary to install the resistive element R0 before the arming switch 26 is toggled to the on position since, if the switch 26 is first toggled to the on position without the resistive element R0 being installed, the window comparator formed by comparators U1 and U2 will sense an incorrect (infinite) resistance across terminals 31 and a later discussed lock-out circuit will be activated which disables the starter system for a prescribed time period. Therefore, it is necessary, prior to toggling the switch 26 to its on position, to install the resistive element R0.

After the resistive element R0 has been installed and the switch 26 has been toggled to the on position, the resistive element R0 may be removed by the operator, and the security switch 12 will remain closed, thus allowing the operator to restart the vehicle as many times as is desired. The foregoing is a result of the latching feature previously described in which the high output of comparator U3 is latched in. This feature may be referred to as a valet function, allowing the vehicle's owner to remove the coded resistive element R0 while a valet attends to parking the vehicle.

When the switch 26 is toggled to its off position, capacitor C1 is discharged to ground and all voltages within the control circuit go to ground. With the switch 26 in the off position, assume for the moment that an attempt is made to start the vehicle by closing the starter switch. Under these circumstances, transistors Q2 and Q3 are off but transistor Q4 conducts because of the presence of the voltage $V_{BAT}$. Consequently, relay coil 18 is energized causing security switch 12 to open, thereby preventing current flow between the battery and starter solenoid. Assuming that the arming switch 26 is toggled to an on position and an incorrect resistance is inserted between the terminals 31 (i.e., an improperly coded resistive element, a short circuit or an open circuit), the outputs of comparators U1 and U2 at terminal 33 will be low. The low output at terminal 33 likewise results in a low output from comparator U3. Consequently, transistors Q2 and Q3 remain off. Hence, when the starter switch 14 is closed, current flows from the collector-to-emitter path of transistor Q4, thereby energizing relay coil 18 and opening the security switch 12 to prevent starting the vehicle. Additionally, the low signal output from comparator U3 disables inverter U4, i.e. the output of inverter U4 goes high, thereby charging capacitor C3 through resistor R13 and diode CR2. Capacitor C3 charges to very nearly V+. Once the voltage on capacitor C3 exceeds the turn on threshold of transistor Q1, Q1 conducts, thereby maintaining the voltage at terminal 33 low. Transistor Q1 remains on to maintain the output of comparator U3 low as long as the arming switch 26 remains closed.

If, after transistor Q1 has been turned on, the arming switch 26 is opened, the charge on capacitor C3 commences decaying. Since the leakage current into the gate terminal of transistor Q1 is negligible, the dominant decay path is through resistor R14. Thus, after switch 26 is opened, transistor Q1 will remain in the conducting state for a period of time which is a function of the values of resistor R14 and capacitor C3. After this time delay, transistor Q1 reverts to a non-conducting state following which the properly coded resistive element R0 may be inserted into terminals 31 in order to start the vehicle.

If, however, before the end of the time-out of capacitor C3, the arming switch 26 is again closed, vehicle start remains inhibited. It should be noted that the low output of comparators U1 and U2 at terminal 33 holds the output of inverter U4 low. Thus, capacitor C3 is recharged to nearly V+ to restore the full value of the time delay. Accordingly, once a false code (resistance) has been entered between terminals 31, the operator must at least wait one full time delay between any opening of the arming switch 26 and its following reclosing. Otherwise, vehicle start remains inhibited.

It should also be noted here that it is not necessary to energize the relay coil 18 to hold the security switch 12 closed against the heavy current flow of the starter solenoid 10. Hence, the dependability of the system is significantly improved where the current demand of the starter motor 22 diminishes the battery voltage to a low level. Since the relay contacts neither make nor break starter solenoid current, system life is substantially extended.

Figure 3:
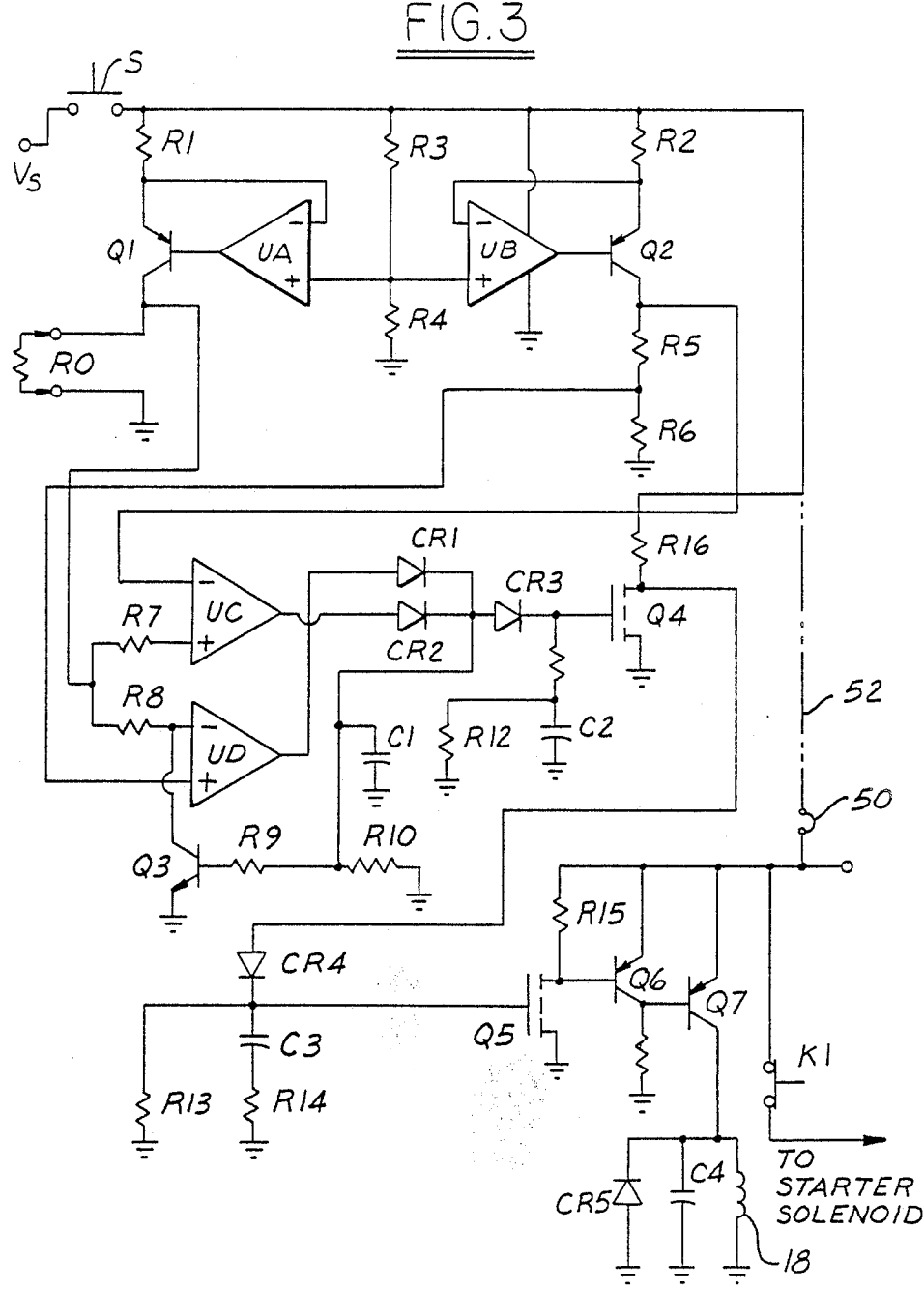

Attention is now directed to FIG. 3 which depicts a detailed schematic diagram of the circuit which forms the preferred embodiment of the invention. The circuit shown in FIG. 3 includes a coded resistor $R_O$, which is unique to the vehicle, as in the case of the embodiment described above. A momentary type switch S is employed to couple the circuit with a suitable source of voltage $V_s$. Switch S functions as an arming device which functions in a manner broadly similar to switch 26 described with reference to FIG. 2 above. However, as will be discussed below, because switch S is of a momentary type, the circuit may be automatically reset after the vehicle's operator turns off the ignition system, and the circuit therefore cannot remain inadvertently armed. Op-amp UA functions as a constant source of current through transistor Q1 to the coded resistor $R_O$. Also, op-amp UB supplies a constant current source through transistor Q2 to the series combination of resistors R5 and R6. Op-amps UC and UD function as a window comparator circuit in which high and low threshold voltages are respectively established by:

$$V_a = I_2 (R_5 + R_6),$$ and $$V_b = I_2 R_6$$

Thus, the condition for enabling the vehicles ignition system to allow starting of the vehicle is:

$$(R1/R2) R6 \leq R_O \leq (R1/R2)(R5+R6)$$

The allowed tolerance on resistor $R_O$ is:

$$\Delta R_O \pm (R_1/2R_2) R_5$$

Thus, if the values of resistors R5 and R6 are fixed, it is only necessary to vary the value of resistor R2 in order to accommodate a large range of nominal values for resistors $R_O$, as well as to provide a tolerance which is always a precise fixed percentage of the nominal $R_O$ value.

When $$(R1/R2) R6 \leq R_O \leq (R1/R2) (R5+R6)$$

the outputs of op-amps UC and UD are both low. Transistor Q4 is therefore nonconducting and capacitor C3 charges to voltage $V_{BAT}$ through resistor R16, diode CR4 and resistor R14. The charging of capacitor C3 therefore turns on transistor Q5 and thus transistor Q6. With transistor Q6 on, transistor Q7 turns off, thereby interrupting the flow of current from the battery ($V_{BAT}$) through the relay coil 18. Deenergization of relay coil 18 allows the normally closed relay switch K1 to remain closed, thus completing a series circuit between the starter solenoid 10, battery 16 and starter switch (FIG. 1), thereby allowing the operator to start the engine.

Diode CR4 is a blocking diode which prevents the discharge of capacitor C3, upon release of switch S, through any path except that through R13. Upon release of the momentary arming switch S, capacitor C3 holds a charge for a length of time which is predetermined by the RC time constant defined as (R13+R14) C3. It may thus be appreciated that the starter-enabled state of the circuit will not be lost immediately upon release of arming switch S. Moreover, the operator is provided with a convenient time window in which he or she may engage the ignition switch while the starter-enabled state of the circuit continues to exist. Moreover, capacitor C3 provides the circuit with a stable lock-in voltage over the engine starting time, during which $V_{BAT}$ may drop to levels at which, without capacitor C3, lock-in would not be obtainable.

It should be noted here that the switch S could be incorporated into or form a part of the normal ignition switch for the vehicle. Thus, switch S could be replaced by the ignition switch 50 in FIG. 3 which is connected to the control circuit and the vehicle's battery through line 52.

The functional results provided by the circuit depicted in FIG. 3 are generally similar to those provided by the circuit depicted in FIG. 2. In the event that an authorized person attempts to start the vehicle but does not insert a coded resistor $R_O$ or arcuate the arming switch S, power is transmitted through the ignition switch from the battery ($V_{BAT}$) to transistor Q5 and Q6. At this point, there is no voltage on the gate of transistor Q5, therefore transistor Q5 is nonconducting. However, the voltage supplied by the ignition switch from $V_{BAT}$ is supplied to transistor Q7, and therefore energizes relay coil 18 which in turn opens the normally closed relay switch K1; as a result current is not allowed to flow from the vehicles battery to the starter solenoid, and the vehicle cannot be started.

In the second mode of operation, in which an unauthorized operator attempts to "decode" the system by using an inappropriately valued coded resistor and actuates the arming switch S, voltage would be applied to the circuit from the source $V_S$. However, the voltage measured across resistor $R_O$ will not fall within the preset range of the window comparator formed by op-amps UC and UD. Accordingly, transistor Q4 remains off. With transistor Q4 off, capacitor C3 cannot be charged and thus transistor Q5 cannot be turned on so as to deenergize relay coil 18 and thus close switch K1. In the third mode of operation, wherein the authorized operator inserts the proper value for coded resistor $R_O$, the voltage sensed across resistor $R_O$ is within the preselected range being monitored by the window comparator (op-amps UC and UD), consequently transistor Q4 turns on to charge capacitor C3, which in turn turns on transistors Q5 and Q6 while turning off transistor Q7 to deenergize the relay coil 18 and effect closure of relay switch K1. After capacitor C3 is charged, the only discharge path for capacitor C3 is through resistors R13 and R14 since diode CR4 acts as a blocking diode to prevent any other significant discharge path. The values of resistors R13 and R14 and capacitor C3 are chosen so that the authorized vehicle operator is provided with a preselected amount of time in which to engage the ignition switch and start the vehicle. After the vehicle is started, transistor Q5 continues to conduct and thus the relay switch K1 remains closed. Thus in effect, relay switch K1 remains locked in after the vehicle is started.

Thus, the circuit of FIG. 3 differs in operation from that shown in FIG. 2 in: (1) the manner in which the voltages are developed across both the coded resistor $R_O$ and the comparison resistors (R3-R6 in FIG. 2 and R5 and R6 in FIG. 3), (2) the manner in which the starter-enabled state of the device, once attained, is maintained and stabilized against variations in $V_{BAT}$, and (3) the manner in which power is brought to the signal processing portion of the circuit.

In connection with the circuit of FIG. 2, a change in the value of the coded resistor $R_O$ necessitates changing the values of resistors R3, R4, R5 and R6, in order to obtain proper window comparator levels and proportionate tolerance. However, in connection with the embodiment depicted in FIG. 3, a change in the value of resistor $R_O$ requires only that resistor R2 be changed in order to obtain proper window levels and proportionate tolerance.

In connection with the circuit depicted in FIG. 2 a substantial number of components are required to maintain the starter-enabled state and stabilize it against variations in $V_{BAT}$, however in connection with the circuit shown in FIG. 3 a relatively simple circuit comprising resistors R13 and R14, capacitor C3 and diode CR4 are needed to provide this same function. Moreover, these latter mentioned components may be mounted in a remote housing with the remaining portions of the signal processor, rather than in the passenger compartment.

Finally, the double-throw switch 26 employed in the circuit of FIG. 2 is replaced by a momentary type switch in the circuit of FIG. 3. The double-throw switch of FIG. 2 was required to be left in the one position until the vehicle was started. In the event that the vehicle operator inadvertently failed to toggle this switch back to its off position, the ignition system remained enabled, thus defeating the purpose of the anti-theft device.

From the foregoing, it is apparent that the anti-theft device described above not only provides for the reliable accomplishment of the objects of the invention but does so in a particularly economical and effective manner. It is recognized, that those skilled in the art may make various modifications or additions to the preferred embodiment chosen to illustrate the invention without departing from the spirit and scope of the present contribution to the art. Accordingly, it is to be understood that the projection sought and to be afforded hereby should be deemed to extend to the subject matter claimed and all equivalents thereof fairly within the scope of the invention.

What is claimed is:

1. An anti-theft device for a vehicle starter ignition system, comprising:
   switch means coupled with said starter ignition system for interrupting the flow of electrical current through said starter ignition system;
   a resistive element having a resistive value essentially unique to said vehicle;
   means for removably mounting said resistive element on said vehicle to allow the vehicle's operator to remove said resistive element from the vehicle in order to prevent theft of said vehicle; and,
   a control circuit coupled with said switch means and said resistive element for sensing the value of said resistive element when the latter is mounted on said vehicle and for controlling said switch means in accordance with the sensed value of resistance of said resistive element, said control circuit including
   (1) means for sensing a voltage across said resistive element,
   (2) means responsive to said sensing means for producing a control signal controlling said switch means when the voltage sensed by said sensing means is within a preselected range of values, and
   (3) means coupled with said sensing means for establishing a voltage which is within said preselected range of voltage values.

2. The anti-theft device of claim 1, wherein said means for establishing the voltage which is within said preselected range of voltage values comprises a resistor having a preselected resistive value, and said preselected range of voltage values is directly related to said preselected resistive value.

3. The anti-theft device of claim 1, including means for storing a quantity of energy sufficient in value to energize said switch means for a preselected length of time during which an authorized operator of the vehicle can start the engines of the vehicle using said starter ignition system.

4. The anti-theft device of claim 1, including an arming switch coupled between a source of electrical power and said control circuit for temporarily applying electrical power from said source to said control circuit.

5. The anti-theft device of claim 1, wherein said sensing means includes means for comparing the voltage across said resistive element with at least one reference value.

6. The anti-theft device of claim 5, wherein said comparing means includes a pair of comparators.

7. The anti-theft device of claim 1, wherein said control signal producing means includes a current switching device and an RC circuit.

8. The anti-theft device of claim 4, wherein said arming switch is defined by a keyed ignition forming part of said ignition system and operable for starting the engine of said vehicle.

9. A plurality of anti-theft devices for a vehicle starter ignition system, each of said devices comprising:
   means coupled with said starter ignition system for selectively preventing the flow of electrical current through said starter ignition system;
   a first resistive element removably mounted on said vehicle and having a resistive value essentially unique to said vehicle, said first resistive element forming a coded key used by an authorized operator of said vehicle to enable said starter ignition system; and,
   a control circuit coupled with said current flow preventing means and said first resistive element for sensing the resistive value of said first resistive element and for controlling the operation of said current flow preventing means in accordance with the sensed value of resistance of said first resistive element, said control circuit including means for comparing the sensed value of said first resistive element with at least one reference value, said comparing means including a second resistive element and a plurality of third resistive elements for establishing said reference value, the resistive value of each of said third plurality of resistive elements being essentially identical for all of said devices.

10. The anti-theft device of claim 9, wherein the second resistive elements for all of said devices possess essentially different resistive values which are respectively functions of the resistive values of the first resistive element of the corresponding device.

11. An anti-theft device for a vehicle starter ignition system, comprising:
    switch means coupled with said starter ignition system for selectively preventing the flow of electrical current through said starter ignition system;
    a resistive element removably mounted on said vehicle and having a resistive value essentially unique to said vehicle, said first resistive element forming a coded key used by an authorized operator of said vehicle to enable said starter ignition system;
    a control circuit coupled with said switch means and said resistive element for controlling said switch means in accordance with the resistive value of said resistive element, said control circuit being settable between a disabled state in which said starter ignition system cannot be enabled by the use of said resistive element, and an enabled state in which said starter ignition system can be enabled by the use of said resistive element; and,
    means for selectively setting said control circuit to either of said enabled and disabled states.

12. The anti-theft device of claim 11, wherein said setting means includes a source of electrical power and a momentary switch for coupling said source of power with said control circuit.

13. The anti-theft device of claim 11, wherein said setting means includes means for storing a preselected amount of electrical power.

14. The anti-theft device of claim 12, wherein said setting means includes a capacitor for storing electrical energy received from said power source through said momentary switch, said control circuit including means powered by electrical energy supplied by said capacitor for controlling said switch means.

* * * * *